(12) United States Patent
Zheng et al.

(10) Patent No.: US 10,354,808 B2
(45) Date of Patent: Jul. 16, 2019

(54) ELECTROCHEMICAL ENERGY STORAGE DEVICE

(71) Applicant: Florida State University Research Foundation, Inc., Tallahassee, FL (US)

(72) Inventors: Jian-ping Zheng, Tallahassee, FL (US); Junsheng Zheng, Tallahassee, FL (US)

(73) Assignee: FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 587 days.

(21) Appl. No.: 15/010,330

(22) Filed: Jan. 29, 2016

(65) Prior Publication Data

US 2017/0062140 A1 Mar. 2, 2017

Related U.S. Application Data

(60) Provisional application No. 62/109,330, filed on Jan. 29, 2015.

(51) Int. Cl.
*H01G 11/06* (2013.01)
*H01G 11/24* (2013.01)
(Continued)

(52) U.S. Cl.
CPC .......... *H01G 11/06* (2013.01); *H01G 11/24* (2013.01); *H01G 11/28* (2013.01); *H01G 11/32* (2013.01);
(Continued)

(58) Field of Classification Search
CPC ...................................... H01G 11/06
See application file for complete search history.

(56) References Cited

U.S. PATENT DOCUMENTS

| 5,963,417 A | 10/1999 | Anderson et al. |
| 6,503,432 B1 * | 1/2003 | Barton .................. H01M 4/621 264/173.16 |

(Continued)

OTHER PUBLICATIONS

International Search Report from PCT/US2016/015627 dated Apr. 1, 2016.
(Continued)

*Primary Examiner* — Sarah A. Slifka
*Assistant Examiner* — Brian R Ohara
(74) *Attorney, Agent, or Firm* — Fox Rothschild LLP

(57) ABSTRACT

An electrochemical energy storage device includes an anode having a first mixture which includes a first plurality of electrically conductive carbon-comprising particles having a first average porosity, and lithium metal materials. The weight ratio of the first plurality of carbon-comprising and lithium metal materials is from 30:1 to 3:1. A cathode includes a second mixture having a second plurality of electrically conductive carbon-comprising particles having a second average porosity greater than the first average porosity, and lithium-intercalating metal oxide particles. The weight ratio of the second plurality of carbon-comprising and lithium-intercalating metal oxide particles is from 1:20 to 5:1. The weight ratio between the lithium metal materials loaded in the anode and the second plurality of carbon-comprising particles in the cathode is from 0.1-10%. An electrolyte physically and ionically contacts the anode and the cathode, and fills the pore volume in the anode, cathode and a porous separator.

21 Claims, 15 Drawing Sheets

(51) Int. Cl.
| | |
|---|---|
| *H01G 11/28* | (2013.01) |
| *H01G 11/32* | (2013.01) |
| *H01G 11/38* | (2013.01) |
| *H01G 11/42* | (2013.01) |
| *H01G 11/50* | (2013.01) |
| *H01G 11/52* | (2013.01) |
| *H01G 11/58* | (2013.01) |
| *H01G 11/66* | (2013.01) |
| *H01G 11/86* | (2013.01) |
| *H01M 4/04* | (2006.01) |
| *H01M 4/131* | (2010.01) |
| *H01M 4/1391* | (2010.01) |
| *H01M 4/525* | (2010.01) |
| *H01M 4/62* | (2006.01) |
| *H01M 4/66* | (2006.01) |
| *H01M 4/02* | (2006.01) |
| *H01M 12/00* | (2006.01) |

(52) U.S. Cl.
CPC .............. *H01G 11/38* (2013.01); *H01G 11/42* (2013.01); *H01G 11/50* (2013.01); *H01G 11/52* (2013.01); *H01G 11/58* (2013.01); *H01G 11/66* (2013.01); *H01G 11/86* (2013.01); *H01M 4/0404* (2013.01); *H01M 4/0409* (2013.01); *H01M 4/0435* (2013.01); *H01M 4/131* (2013.01); *H01M 4/1391* (2013.01); *H01M 4/525* (2013.01); *H01M 4/623* (2013.01); *H01M 4/625* (2013.01); *H01M 4/661* (2013.01); *H01M 12/005* (2013.01); *H01M 2004/021* (2013.01); *H01M 2004/027* (2013.01); *H01M 2004/028* (2013.01); *H01M 2220/20* (2013.01); *Y02E 60/13* (2013.01); *Y02T 10/7022* (2013.01)

(56) References Cited

U.S. PATENT DOCUMENTS

| | | | |
|---|---|---|---|
| 2003/0134196 A1* | 7/2003 | Chen | H01M 2/0222 429/213 |
| 2007/0287060 A1* | 12/2007 | Naoi | H01M 4/38 429/122 |
| 2009/0092903 A1 | 4/2009 | Johnson et al. | |
| 2009/0226797 A1* | 9/2009 | Yoshitake | H01M 4/587 429/50 |
| 2012/0122652 A1 | 5/2012 | Worsley et al. | |
| 2013/0070391 A1 | 3/2013 | Zheng | |
| 2013/0171502 A1 | 4/2013 | Chen et al. | |

OTHER PUBLICATIONS

Lipka S. M., Reisner D. E., Dai J., Cepulis R., in Proceedings of 11th International Seminar on Double Layer Capacitors, Florida Educational Seminars, Inc., Boca Raton (2001).

Zheng J. P., Jow T. R., J. Electrochem. Soc. 0013-4651, 142, L6 (1995).

W.J. Cao, Y.X. Li, B. Fitch, J. Shih, T. Doung, J.P. Zheng, "Strategies to optimize lithium-ion supercapacitors achieving high performance: Cathode configurations, lithium loadings on anode, and types of separator", Journal of Power Sources, 268, 841 (2014).

W.J. Cao and J.P. Zheng, "Li-ion Capacitors with Carbon Cathode and Hard Carbon/SLMP Anode Electrodes", J. Power Sources, 213, 180 (2012).

W.J. Cao, J.S. Zheng, D. Adams, J.P. Zheng, "Comparative Study of the Power and Cycling Performance for Advanced Lithium-Ion Capacitors with Various Carbon Anodes", J. Electrochem. Soc., 161, A2087 (2014).

P.L. Moss, G. Au, E.J. Plichta, and J.P. Zheng "Study of Capacity Fade of Lithium-Ion Polymer Rechargeable Batteries with Continuous Cycling", J. Electrochem. Soc. 157, A1 (2010).

Amatucci G. G., Badway F., Pasquier A. D., Zheng T., J. Electrochem. Soc. 0013-4651, 148, A930 (2001).

\* cited by examiner

FIG. 3A
FIG. 3B
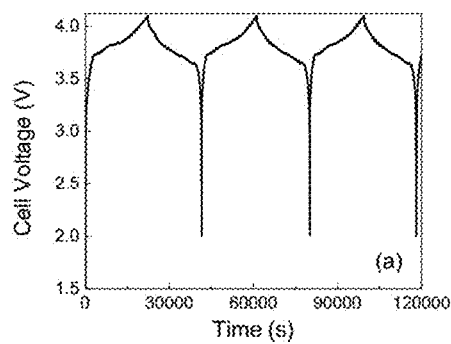
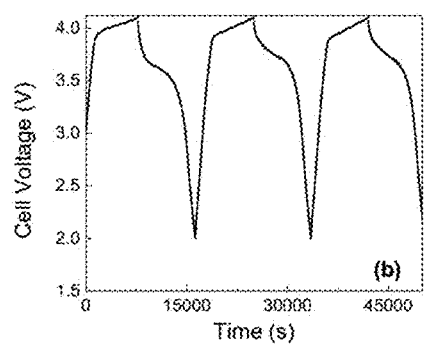
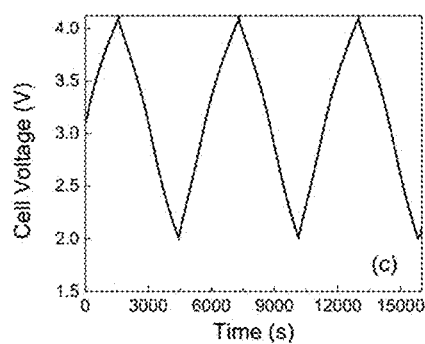
FIG. 3C

FIG. 4A
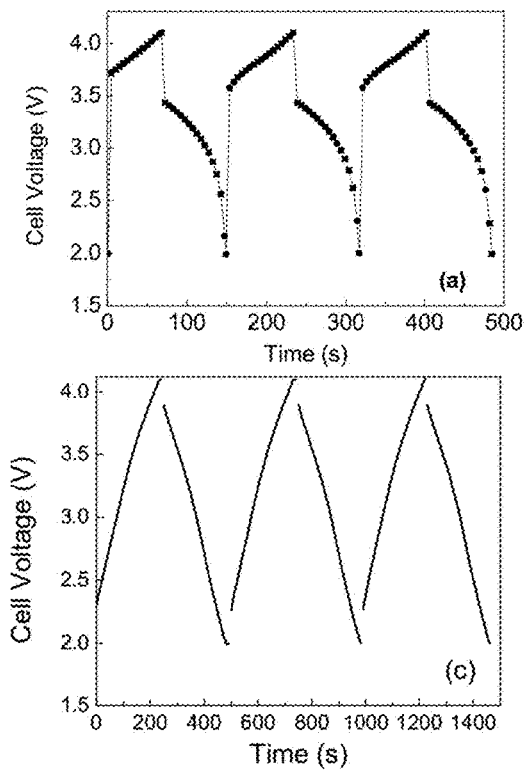
(a)
FIG. 4B
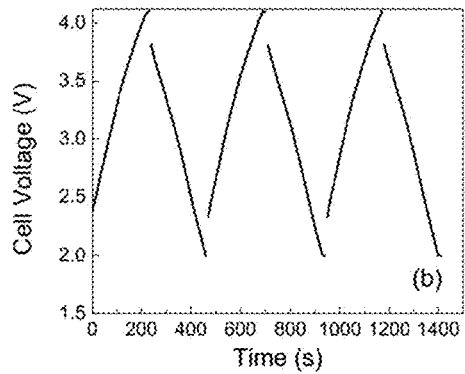
(b)
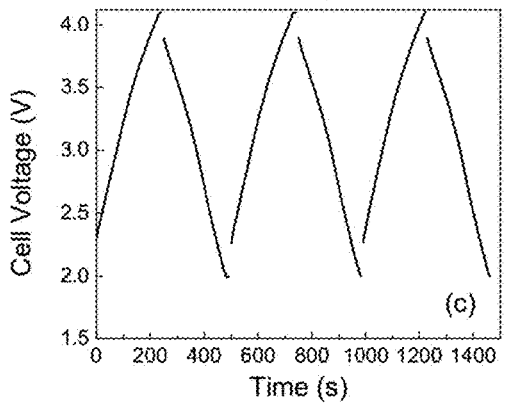
(c)
FIG. 4C

ELECTROCHEMICAL ENERGY STORAGE DEVICE

CROSS-REFERENCE TO RELATED APPLICATION

This application claims priority to U.S. Provisional Application No. 62/109,330, filed Jan. 29, 2015, entitled A NOVEL HYBRID ELECTROCHEMICAL DEVICE BASED ON INNER COMBINATION OF LI-ION BATTERY AND LI-ION CAPACITOR FOR ENERGY, the entirety of which is incorporated herein by reference.

STATEMENT REGARDING FEDERALLY SPONSORED RESEARCH

This invention was made with government support under Contract No. %27322 Project ID 036094 and Contract No. %24974 Project ID 033582 awarded by the Pacific Northwest National Laboratory. The government has certain rights in this invention.

FIELD OF THE INVENTION

The present invention relates generally to energy storage devices, and more particularly to electrochemical energy storage devices.

BACKGROUND OF THE INVENTION

The automotive industry has made remarkable contributions to world economy and human mobility, and automobiles have been viewed as a boon to individualism, freedom and liberation of modern society. The use of automobiles consumes considerable amounts of fossil fuels and it becomes an important source of environmental impact. About 70% of oil consumed serves for transportation and more than half of the contaminants come from tail gases of vehicles. The development of electric vehicles (EVs) is considered as one of the solutions to those problems and many different EVs have been introduced to marketplace in recent years and have become increasingly popular.

It is well known that EVs have a lot of advantages over the conventional motorcar, such as an easy operation, no emissions of foul odors or gases and a quiet ride.

As road vehicles, the state-of-the-art EVs have three major problems: a limited travel range, a slow start speed and a high price. Those problems are determined by the energy storage systems (ESSs) of the vehicles. The most widely used ESSs of EVs include batteries, fuel cells and electrochemical capacitors (ECs). A battery is comprised of one or more electrically connected electrochemical cells having terminals/contacts to supply electrical energy, and an EC is a device that stores electrical energy in the electrical double layer which forms at the interface between an electrolytic solution and an electronic conductor.

Each ESS has its own advantages and drawbacks. EC and Li-ion battery (LiB) are introduced as ESSs for EVs because they can provide a high energy density or a high power density. These devices are at two ends of the energy storage spectrum. In a LiB, the lithium ions move from the negative electrode to the positive electrode during discharge, and this process can provide a high chemical energy. However, the power density is quite low due to a low speed of Li-ions movement and intercalation. Although the LiB has a high energy density from 120 to 200 Wh/kg, the power density is only about 100 W/kg. But in an EC, the main source of energy results from the electrolyte adsorption/desorption on the electrodes. This process is extremely fast in comparison with the chemical reaction process of a LiB. Therefore, ECs have a high power density, ranging from 2 to 10 kW/kg or more, because of the relatively high speed of Li-ions absorption/desorption, but the energy density is only 2 to 5 Wh/kg. Therefore, it was proven difficult for a traditional ESS to achieve the demands of both energy density as well as power density for EVs.

To solve those problems, researchers have proposed different solutions. One of the most widely used approaches is to develop a hybrid system consisting of an EC electrode and a battery electrode [Lipka S. M., Reisner D. E., Dai J., Cepulis R., in Proceedings of 11th International Seminar on Double Layer Capacitors, Florida Educational Seminars, Inc., Boca Raton (2001). Amatucci G. G., Badway F., Pasquier A. D., Zheng T., J. Electrochem. Soc. 0013-4651, 148, A930 (2001). Zheng J. P., Jow T. R., J. Electrochem. Soc. 0013-4651, 142, L6 (1995)]. In this structure, the positive electrode stores charge through a reversible non-faradaic reaction of anions and the negative electrode utilizes a reversible faradic reaction of lithium-ion insertion/extraction in a nano-sized lithium-ion intercalated compound. Compared with traditional ECs, the hybrid EC shows a higher energy density. Telcordia Technologies has proposed a new device named nonaqueous asymmetric hybrid electrochemical supercapacitor (HBEC) with an intercalation compound $Li_4Ti_5O_{12}$ as the negative material and active carbon as the positive material. Glenn G. Amatucci Fadwa Badway, Aurelien Du Pasquier, Tao Zheng, "An Asymmetric Hybrid Nonaqueous Energy Storage Cell". Journal of The Electrochemical Society, 148(8)A930-A939 (2001). However, the energy density of these devices is too low to be used as ESS for EVs, and more work still remains to be done on this topic.

It has been previously reported that a novel structured lithium-ion capacitors (LiCs) can be provided by replacing the conventional activated carbon anode with a hard carbon (HC) anode covered by a stabilized lithium metal powder (SLMP) layer on surface [W. J. Cao, Y. X. Li, B. Fitch, J. Shih, T. Doung, J. P. Zheng, "Strategies to optimize lithium-ion supercapacitors achieving high performance: Cathode configurations, lithium loadings on anode, and types of separator", Journal of Power Sources, 268, 841 (2014). W. J. Cao and J. P. Zheng, "Li-ion Capacitors with Carbon Cathode and Hard Carbon/SLMP Anode Electrodes", J. Power Sources, 213, 180 (2012). 2. W. J. Cao, J. S. Zheng, D. Adams, J. P. Zheng, "Comparative Study of the Power and Cycling Performance for Advanced Lithium-Ion Capacitors with Various Carbon Anodes", J. Electrochem. Soc., 161, A2087 (2014). The added SLMP layer can increase the open circuit voltage of the EC and ensure less salt to be consumed when it is charged. This LiC is capable of storing approximately 5 times more energy than conventional ECs and has the benefit of a high power density. Although the LiC can improve the energy density, it is very difficult to improve the energy density of a LiC too much because of chemical properties, and as a consequence achieving the high energy density requirement of EVs is still difficult to attain.

SUMMARY OF THE INVENTION

An electrochemical energy storage device includes an anode comprising a first mixture. The first mixture includes a first plurality of electrically conductive carbon-comprising particles having a first average porosity, and lithium metal materials. The weight ratio of the first plurality of carbon-comprising and lithium metal materials is from 30:1 to 3:1. An electrically conductive current collector connects to the anode. A cathode includes a second mixture, the second mixture comprising a second plurality of electrically conductive carbon-comprising particles having a second average porosity greater than the first average porosity and lithium-intercalating metal oxide particles. The weight ratio of the second plurality of carbon-comprising and lithium-intercalating metal oxide particles is from 1:20 to 5:1. The weight ratio between the lithium metal materials loaded in the anode and the second plurality of carbon-comprising particles in the cathode is from 0.1-10%. An electrically conductive current collector connects to the cathode. A porous separator is provided between the anode and the cathode. An electrolyte physically and ionically contacts the anode and the cathode, and fills the pore volume in the anode, cathode and separator.

The weight ratio between the lithium metal materials in the anode and the second plurality of carbon-comprising particles in the cathode can be from 0.3-5%. The weight ratio between the lithium metal materials in the anode and the second plurality of carbon-comprising particles in the cathode can be from 0.6-1.7%.

The second plurality of carbon-comprising particles in the cathode can have an electrical conductivity greater than 1 S/cm. The second plurality of carbon-comprising particles in the cathode can have a specific surface area greater than 500 $m^2/g$. The second plurality of carbon-comprising particles in the cathode can have a specific capacitance greater than 50 F/g. The second plurality of carbon-comprising particles in the cathode can have a porosity greater than 50%.

The wherein the weight ratio of the first plurality of carbon-comprising and lithium metal materials in the anode can be from 20:1 to 8:1. The weight ratio of the first plurality of carbon-comprising and lithium metal materials in the anode can be from 17:1 to 11:1.

The wherein the weight ratio of the second plurality of carbon-comprising and lithium-intercalating metal oxide particles in the cathode can be from 1:5 to 3:1. The weight ratio of the second plurality of carbon-comprising and lithium-intercalating metal oxide particles in the cathode can be from 1:2 to 2:1.

The first plurality of carbon-comprising particles can include at least one selected from the group consisting of hard carbon, soft carbon, graphitic carbon, carbon black, carbon microbeads, carbon microbeads, and carbon nanotubes.

The second plurality of carbon-comprising particles can include at least one selected from the group consisting of activated carbon, carbon microbeads, carbon black, carbon nanotubes, activated carbon nanotubes, and activated carbon nanofibers.

The lithium metal oxide particles can include at least one selected from the group consisting of $LiCoO_2$ (lithium cobalt oxide), $LiNi_{0.8}Co_{0.15}Al_{0.05}O_2$ (NCA), $LiMn_2O_4$ (spinel), $LiV_3O_8$, $LiNi_{1/3}Mn_{1/3}Co_{1/3}O_2$ (NMC 333), $LiMn_x\text{-}Co_yNi_zO_2$ (NMC non-stoichiometric), $LiFePO_4$ (lithium iron phosphate), $xLi_2MnO_3.(1-x)LiMO_2$, $LiNi_{1/3}Mn_{1/3}Co_{1/3}O_2$, $LiNi_{1/3}Mn_{1/3}Co_{1/3}O_2$, $Li[Li_{0.2}Mn_{0.54}Ni_{0.13}Co_{0.13}]O_2$, and $Li[Li_{0.2}Mn_{0.54}Ni_{0.13}C_{o0.13}]O_2$.

A method of producing an electrochemical energy storage device includes the step of disposing a first mixture on a first current collector. The first mixture includes a plurality of lithium metal materials and a first plurality of lithium-intercalating electrically conductive carbon-comprising particles. The weight ratio of carbon-comprising and lithium metal materials can be from 30:1 to 3:1. A second mixture is disposed on a second current collector. The second mixture includes a second plurality of electrically conductive carbon-comprising and lithium-intercalating metal oxide particles. The weight ratio of carbon-comprising and lithium-intercalating metal oxide particles can be from 1:20 to 5:1. The weight ratio between the lithium metal materials in the anode and the carbon-comprising particles in the cathode can be from 0.1-10%. A housing is provided and positioned within the housing are the first current collector, second current collector, with an electrically insulating porous separating layer there between. An electrolyte is introduced into the housing.

The first mixture in an initial state can further comprises a plurality of lithium metal materials mixed with the first plurality of carbon-comprising particles. The first plurality of carbon-comprising particles in the initial state can be substantially free of lithium ions. The first mixture in an initial state can comprise two layers, comprising a layer of lithium metal materials and a layer of the first plurality of carbon-comprising particles. The layer of lithium metal materials at the initial state can be positioned between the layer of the first plurality of carbon-comprising particles and the separating layer. The layer of lithium metal materials at the initial state can be positioned between the first plurality of electrically conductive carbon and the current collector.

The second mixture in an initial state can comprise lithium-intercalating metal oxide particles mixed with the second plurality of carbon-comprising particles. The second mixture in an initial state can comprise two layers comprising a layer of the lithium-intercalating metal oxide particles and a layer of the second plurality of carbon-comprising particles. The second mixture in an initial state can comprise multiple layers comprising alternating layers of the lithium-intercalating metal oxide particles and the second plurality of carbon-comprising particles. The second mixture in an initial state can comprise side-by-side layers of the lithium-intercalating metal oxide particles and the second plurality of carbon-comprising particles.

An electrochemical energy storage device comprising multiple unit cells can be provided where each unit cell includes an anode comprising a first mixture. The first mixture comprises a first plurality of electrically conductive carbon-comprising particles having a first average porosity, and lithium metal particles. The weight ratio of the first plurality of carbon-comprising and lithium metal particles can be from 30:1 to 3:1. An electrically conductive current collector connects to the anode. A cathode can include a second mixture. The second mixture comprises a second plurality of electrically conductive carbon-comprising particles having a second average porosity greater than the first average porosity and lithium-intercalating metal oxide particles. The weight ratio of the second plurality of carbon-comprising and lithium-intercalating metal oxide particles can be from 1:20 to 5:1. The weight ratio between the lithium metal particles in the anode and the second plurality of carbon-comprising particles in the cathode can be from 0.1-10%. An electrically conductive current collector connects to the cathode. A porous separator can be provided between the anode and cathode. An electrolyte physically and ionically contacts the anode and the cathode, and fills the pore volume in the anode, cathode and separator. The electrochemical energy storage device can be a pouch cell.

An electrochemical energy storage device can include an anode comprising a first mixture. The first mixture comprises a first plurality of electrically conductive particles having a first average porosity, and lithium metal particles.

The weight ratio of the first plurality of particles and the lithium metal particles can be from 30:1 to 3:1. An electrically conductive current collector connects to the anode. A cathode comprises a second mixture. The second mixture comprises a second plurality of electrically conductive particles having a second average porosity greater than the first average porosity and lithium-intercalating metal oxide particles. The weight ratio of the second plurality of particles and the lithium-intercalating metal oxide particles can be from 1:20 to 5:1. The weight ratio between the lithium metal particles in the anode and the second plurality of particles in the cathode can be from 0.1-10%. An electrically conductive current collector connects to the cathode. A porous separator can be provided between the anode and the cathode. An electrolyte physically and ionically contacts the anode and the cathode, and fills the pore volume in the anode, cathode and separator. The first plurality of electrically conductive particles can comprise at least one selected from the group consisting of carbon, silicon, lithium titanate ($Li_4Ti_5O_{12}$), and tin. The second plurality of electrically conductive particles can comprise carbon.

BRIEF DESCRIPTION OF THE DRAWINGS

There are shown in the drawings embodiments that are presently preferred it being understood that the invention is not limited to the arrangements and instrumentalities shown, wherein:

FIG. 2A: AC cathode, FIG. 2B: $LiCoO_2$ cathode.

FIGS. 3A, 3B and 3C are voltage profiles of 3-electrode cells with various positive electrodes with a current of 0.4 $mA/cm^2$: 3A $LiCoO_2$, 3B $LiCoO_2$/AC, 3C AC.

FIGS. 4A, 4B and 4C are voltage profiles of 3-electrode cells with various positive electrodes with a current of 5 $mA/cm^2$: 4A $LiCoO_2$, 4B $LiCoO_2$/AC, 4C AC.

DETAILED DESCRIPTION OF THE INVENTION

Figure 1:
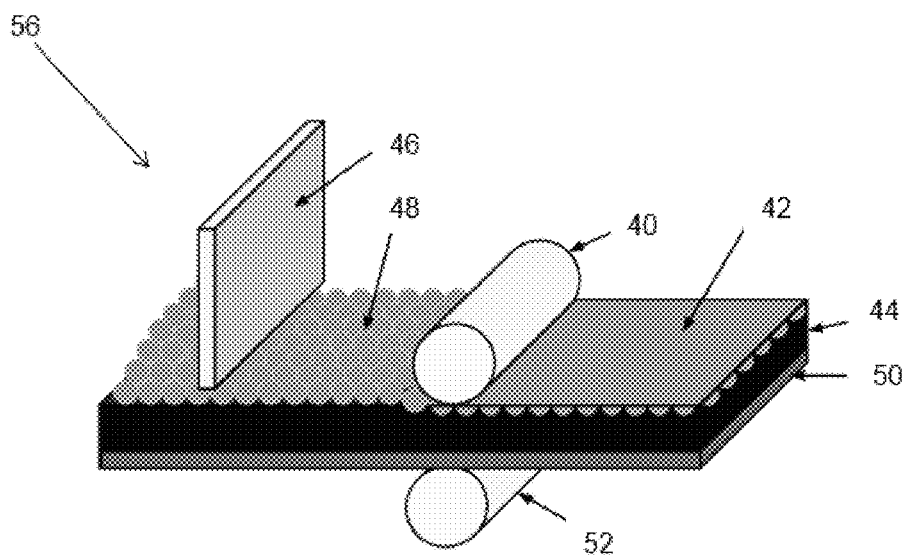
FIG. 1 is a schematic diagram of a doctor blade process for electrode fabrication.

Li-ion batteries (LiB) and electrochemical capacitors (LiC) are considered as the most widely used energy storage systems (ESSs) for electric vehicles (EVs). They can produce a high energy density or a high power density, but it is currently not possible for a traditional ESS to achieve the demands of energy density as well as power density for EVs. The invention provides an electrochemical energy storage device with the chemical properties of both a LiB and a LiC, and which can avoid their inherent defects. The voltage profiles for cells shows that at low current, the device of the invention has a higher energy density than LiC. At a high current, the device has a higher energy density than LiB. The Ragone plot proves that this device has the advantages of both the electrode of Li-ion battery and Li-ion capacitor, and can provide a balanced energy density and power density, and can satisfy the demands of both high energy density and high power density required by some energy storage systems.

Electrical energy in LiBs is generated by conversion of chemical energy via oxidation/reduction reactions, while in LiCs energy is generated by orientation of electrolyte ions at the electrolyte/electrolyte interface. Consequently, batteries have high-energy characteristics and ECs are considered to be high-power systems. Uses requiring a high energy density as well as a high power density, require that the device not only can absorb/desorb charges during the charge/discharge processes, but also can storage and convert energy by oxidation/reduction reactions.

The anode of the device of the invention can be a LiC negative electrode, which can keep a more negative potential and can provide a balance of electrolytes and also provide a higher energy density. The cathode is a combination of $LiCoO_2$, a LiB material, and activated carbon (AC), a LiC material. At a low operating output, this device will reflect the characteristic of a LiB and provide a high energy density. At a high operating output, this device will exhibit features of a LiC and provide a high power density. Consequently, a high power density and a high energy density and thus a competitive performance in comparison to combustion engines and turbines can be achieved.

An electrochemical energy storage device according to the invention includes an anode comprising a first mixture. The first mixture can have a first plurality of electrically conductive carbon-comprising particles having a first average porosity. The first mixture also includes lithium metal particles. The weight ratio of the first plurality of carbon-comprising and lithium metal particles can be from 30:1 to 3:1. An electrically conductive current collector can be connected to the anode.

A cathode includes a second mixture. The second mixture has a second plurality of electrically conductive carbon-comprising particles having a second average porosity greater than the first average porosity. The second mixture also includes lithium-intercalating metal oxide particles. The weight ratio of the second plurality of carbon-comprising and lithium-intercalating metal oxide particles can be from 1:20 to 5:1. The weight ratio between the lithium metal particles loaded in the anode and the second plurality of carbon-comprising particles in the cathode is from 0.1-10%. An electrically conductive current collector can be connected to the cathode.

A porous separator is provided between the anode and the cathode. Any suitable separator can be used such as polymer separators, fiber glass, nonwovens, and supported liquid membranes. An electrolyte physically and ionically contacts the anode and the cathode, and fills the pore volume in the anode, cathode and separator. Any suitable electrolyte can be used such as salts from $LiPF_6$, LiODFB, LiTFSI, LiFSI, $LiPF_4(CF_3)_2$, $LiBF_4$, LiBOB, $LiClO_4$, and $LiAsF_6$, dissolved in appropriate solvents. Suitable solvents include high dielectric constant carbonate solvents such as ethylene carbonate (EC) and propylene carbonate (PC), which are able to dissolve sufficient amounts of lithium salt, low viscosity carbonate solvents such as dimethyl carbonate (DMC) and diethyl carbonate (DEC) for high ionic conductivity, and ether solvents such as tetrahydrofuran (THF) dimethoxyethane (DME) for improved lithium morphology in order to suppress dendritic lithium growth during the cycles.

The weight ratio between the lithium metal particles in the anode and the second plurality of carbon-comprising particles in the cathode can be from 0.3-5%. The weight ratio between the lithium metal particles in the anode and the second plurality of carbon-comprising particles in the cathode can be from 0.6-1.7%.

The weight ratio between the lithium metal materials in the anode and the second plurality of carbon-comprising particles in the cathode can be 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0%. The weight ratio between the lithium metal materials in the anode and the second plurality of carbon-comprising particles in the cathode can be in a range between any high and low of the above.

The second plurality of carbon-comprising particles in the cathode can have an electrical conductivity greater than 1 S/cm. The second plurality of carbon-comprising particles in the cathode has a specific surface area greater than 500 m$^2$/g. The second plurality of carbon-comprising particles in the cathode can have a specific capacitance greater than 50 F/g.

The second plurality of carbon-comprising particles in the cathode can have a porosity greater than 50%.

The weight ratio of the first plurality of carbon-comprising and lithium metal particles in the anode can be from 20:1 to 8:1. The weight ratio of the first plurality of carbon-comprising and lithium metal particles in the anode can be from 17:1 to 11:1.

The weight ratio of the second plurality of carbon-comprising and lithium-intercalating metal oxide particles in the cathode can be from 1:5 to 3:1. The weight ratio of the second plurality of carbon-comprising and lithium-intercalating metal oxide particles in the cathode can be from 1:2 to 2:1.

The first plurality of carbon-comprising particles can comprise at least one selected from the group consisting of hard carbon, soft carbon, graphitic carbon, carbon black, carbon microbeads, carbon nanotubes, and carbon nanofibers.

The second plurality of carbon-comprising particles can comprise at least one selected from the group consisting of activated carbon, carbon microbeads, carbon black, carbon nanotubes, activated carbon nanotubes, and activated carbon nanofibers.

The lithium metal oxide particles can comprise at least one selected from the group consisting of $LiCoO_2$ (lithium cobalt oxide), $LiNi_{0.8}Co_{0.15}Al_{0.08}O_2$ (NCA), $LiMn_2O_4$ (spinel), $LiV_3O_8$, $LiNi_{1/3}Mn_{1/3}Co_{1/3}O_2$ (NMC 333), $LiMn_xCo_yNi_zO_2$ (NMC non-stoichiometric) where x+y+z=1, $LiFePO_4$ (lithium iron phosphate), $xLi_2MnO_3.(1-x)LiMO_2$, $LiNi_{1/3}Mn_{1/3}Co_{1/3}O_2$, $LiNi_{1/3}Mn_{1/3}Co_{1/3}O_2$, $Li[Li_{0.2}Mn_{0.54}Ni_{0.13}Co_{0.13}]O_2$, and $Li[Li_{0.2}Mn_{0.54}Ni_{0.13}Co_{0.13}]O_2$.

A method of producing an electrochemical energy storage device can include the step of disposing a first mixture on a first current collector. The first mixture can include a plurality of lithium metal particles and a first plurality of lithium-intercalating electrically conductive carbon-comprising particles. The weight ratio of carbon-comprising and lithium metal particles can be from 30:1 to 3:1.

A second mixture can be disposed on a second current collector. The second mixture includes a second plurality of electrically conductive carbon-comprising and lithium-intercalating metal oxide particles. The weight ratio of carbon-comprising and lithium-intercalating metal oxide particles can be from 1:20 to 5:1. The weight ratio between the lithium metal particles in the anode and the carbon-comprising particles in the cathode can be from 0.1-10%.

A housing can be provided and within the housing can be positioned the first current collector, second current collector, with an electrically insulating porous separating layer there between. An electrolyte can then be introduced into the housing.

The first mixture in an initial state can further comprise a plurality of lithium metal materials such as particles mixed with the first plurality of carbon-comprising particles. The first plurality of carbon-comprising particles in the initial state can be substantially free of lithium ions. The lithium metal particles can applied on the surface of anode electrode made with the first plurality of carbon-comprising particles and the lithium metal particles can also mix with the first plurality of carbon-comprising particles then form an anode electrode. The amount of lithium metal particles mixed the first plurality of carbon-comprising particles should compensate the ion required by activated carbon in the cathode during discharge process.

The first mixture in an initial state can further comprise two layers, comprising a layer of lithium metal particles and a layer of the first plurality of carbon-comprising particles. The layer of lithium metal particles at the initial state can be positioned between the layer of the first plurality of carbon-comprising particles and the separating layer. The layer of lithium metal particles at the initial state can be positioned between the first plurality of electrically conductive carbon and the current collector.

The second mixture in an initial state can further comprise lithium-intercalating metal oxide particles mixed with the second plurality of carbon-comprising particles. The second mixture in an initial state can further comprise two layers comprising a layer of the lithium-intercalating metal oxide particles and a layer of the second plurality of carbon-comprising particles. The second mixture in an initial state can comprise multiple layers comprising alternating layers of the lithium-intercalating metal oxide particles and the second plurality of carbon-comprising particles. The second mixture in an initial state can comprise side-by-side layers of the lithium-intercalating metal oxide particles and the second plurality of carbon-comprising particles.

An electrochemical energy storage device can include multiple unit cells. Each unit cell can include an anode including a first mixture. The first mixture includes a first plurality of electrically conductive carbon-comprising particles having a first average porosity, and lithium metal particles. The weight ratio of the first plurality of carbon-comprising and lithium metal particles can be from 30:1 to 3:1. An electrically conductive current collector can connect to the anode.

A cathode can include a second mixture. The second mixture includes a second plurality of electrically conductive carbon-comprising particles having a second average porosity greater than the first average porosity and lithium-intercalating metal oxide particles. The weight ratio of the second plurality of carbon-comprising and lithium-intercalating metal oxide particles can be from 1:20 to 5:1. The weight ratio between the lithium metal particles in the anode and the second plurality of carbon-comprising particles in the cathode can be from 0.1-10%. An electrically conductive current collector can be connected to the cathode.

A porous separator between the anode and cathode. An electrolyte physically and ionically contacts the anode and the cathode, and fills the pore volume in the anode, cathode and separator. The electrochemical energy storage device can be a pouch cell.

An electrochemical energy storage device can include an anode including a first mixture. The first mixture includes a first plurality of electrically conductive particles having a first average porosity, and lithium metal particles. The weight ratio of the first plurality of particles and the lithium metal particles can be from 30:1 to 3:1. An electrically conductive current collector can be connected to the anode. A cathode can include a second mixture. The second mixture includes a second plurality of electrically conductive particles having a second average porosity greater than the first average porosity and lithium-intercalating metal oxide particles. The weight ratio of the second plurality of particles and the lithium-intercalating metal oxide particles can be from 1:20 to 5:1. The weight ratio between the lithium metal particles in the anode and the second plurality of particles in the cathode can be from 0.1-10%. An electrically conductive current collector can be connected to the cathode. A porous separator can be provided between the anode and the cathode. An electrolyte physically and ionically contacts the anode and the cathode, and fills the pore volume in the anode, cathode and separator. The first plurality of electrically conductive particles can include at least one selected from the group consisting of carbon, silicon, lithium titanate (Li4Ti5O12), and tin. The second plurality of electrically conductive particles can include carbon.

Example cells were prepared. Commercial active materials were used for both the positive and negative electrodes as received. The slurry mixture of the negative electrode was made of hard carbon (HC, Carbotron P(J), Kureha Japan) and 5% polytetrafluoroethylene (PTFE) in N-methyl-2-pyrrolidone (NMP) as a binder by the mass ratio of 92:8. After the slurry was prepared, a doctor blade (FIG. 1) technique was employed to spread the obtained slurry onto a Cu foil substrate with a thickness of 10 μm. As shown in FIG. 1 the doctor blade process 56 utilizes blade 48 on SLMP 48 and then presses hard carbon 44 and copper current collector 50 with SLMP 48 between rollers 40 and 52 to produce pressed SLMP 42. Then the electrodes were dried at 120° C. for 2 hours in an oven with flowing air.

The positive electrode based on AC was prepared by coating a slurry mixture of activated carbon (AC) and PTFE in a binder of NMP by the mass ratio of 9:1. The positive electrode based on $LiCoO_2$ was prepared by mixing 85% active material, 10% carbon black, and 5% PTFE in NMP. After the slurry was prepared, it was coated onto an Al foil substrate (Exopack™, 20 μm in thickness) with a thickness of 10 μm by the mentioned doctor blade process. Finally, the electrode was dried at 120° C. for 12 h to remove the solvent and water.

After all the electrodes were dried, a hot-roll pressing was applied to the prepared electrode sheets to make them into the desired thickness. All the electrode sheets were kept in the dry room and punched out into circle electrodes with a diameter of 1.27 cm (active area).

The stabilized lithium metal powder (SLMP) was applied onto the surface of the prefabricated HC anode electrodes in a glove box filled with Argo gas. The SLMP, made by FMC Lithium, is Li powder with a passivation layer at the surface and can be safely handled in a dry room atmosphere and the size of the powder is about 10-200 nm.

The amount of SLMP applied to anode electrode should be dependent on the amount of activated carbon (AC) used at cathode electrode. Theoretically, the capacity of SLMP should match with that of activated carbon. The specific capacity of SLMP ($c_{SLMP}$) is:

$$c_{SLMP} = \alpha F/w_{Li} = 3862 \text{ mAh/g} \times \alpha \quad (1)$$

where, F is the Faraday constant and is 96,485 C/mol (or 26,801 mAh/mol), $w_{Li}$ is Li atomic weight and is 6.94 g/mol, and a is the purity of SLMP and was in a range of 95-97%. The equivalent specific capacity ($c_{AC}$) of activated carbon can be estimated as:

$$c_{AC} = c_p \Delta V \quad (2)$$

Where $c_p$ is the specific capacitance of the activated carbon and in a range of 80-120 F/g for using organic electrolytes, $\Delta V$ is the swing voltage of cathode electrode at 1-2 V; therefore, $c_{AC}$ is in a range of 22-67 mAh/g.

The SLMP was applied to the anode electrode to compensate ions required by the activated carbon at the cathode electrode. The advantages of using SLMP are that it can be uniformly applied on the surface of anode electrode and the weight of SLMP can be precisely controlled. However, other types of Li can also be used to compensate ions required by the activated carbon at cathode electrode. For example, Li foils can partially or fully cover the surface of anode electrode or Li strips can partially cover the surface of the anode electrode. The amount of Li applied to the anode electrode still can be calculated according to Eqns. (1) and (2).

When the hybrid cell was assembled with the cathode comprised of activated carbon and lithium-intercalating metal oxide particles, the anode comprised of lithium-intercalating carbon and lithium metal particles, and a porous separator between the cathode and the anode, and without electrolyte, both potentials of the cathode and the anode were about 3 V vs. Li/Li+. When the electrolyte was filled into the cell, the lithium metal at anode intercalated into the lithium-intercalating carbon and the potential of the anode reduces with time until the all lithium metal intercalates into the carbon. The final potential of the anode is determined by the weight ratio between the lithium metal and the lithium-intercalating carbon.

The total anode capacity in the hybrid cell should be matched with the total capacity of the cathode, or the sum of the capacities of the activated carbon and the lithium-intercalating metal oxide. The lithium metal particles that are applied to the anode are used to compensate for the ions required by the activated carbon in the cathode. Therefore, the weight ratio between lithium metal powder loaded ($m_{SLMP}$) at anode and the activated carbon loaded ($m_{AC}$) at cathode can be expressed as:

$$\frac{m_{SLMP}}{m_{AC}} = \frac{c_{AC}}{c_{SLMP}} \quad (3)$$

where, $c_{AC}$ and $c_{SLMP}$ are the specific capacities of activated carbon and SLMP, respectively, and described in Eqns. (1) and (2). From Eqn. (1), the specific capacity of lithium ($c_{SLMP}$) is about 3862 mAh/g, and from Eqn. (2), the equivalent specific capacity of activated carbon is in a range of 22-67 mAh/g; therefore, the theoretical value for the weight ratio between lithium metal powder at the anode and activated carbon at the cathode is 0.6-1.7%. In practice, some of lithium metal powder may not be finally utilized due to various imperfect conditions; therefore, the actual the weight ratio may vary according to the actual situation.

The lithium can be added at the anode by any suitable process or construction. The SLMP can be mixed with the anode material, layered on the anode material or provided as a foil at the anode.

Two-electrode Swagelok-type cells were assembled to characterize the performances of cells. Cells was charged and discharged under a constant current density of potentials from 2.0 to 4.1 V. The electrolyte was 1 M Li $PF_6$ in ethylene carbonate (EC): dimethyl carbonate (DMC) at a ratio of 1:1 by weight (LP30, SelectiLyte™, Merck Electrolyte).

The electrochemical impedance spectrum (EIS) for the cells was measured in the frequency range of 1 MHz to 0.1 Hz using a Gamry Instruments. There resulted spectrum was fitted by Gamry Echem Analyst program. The morphology of the electrodes was observed by SEM.

The SEM images of the positive electrodes based on AC and $LiCoO_2$ are displayed in FIG. 2.

Figure 2A:
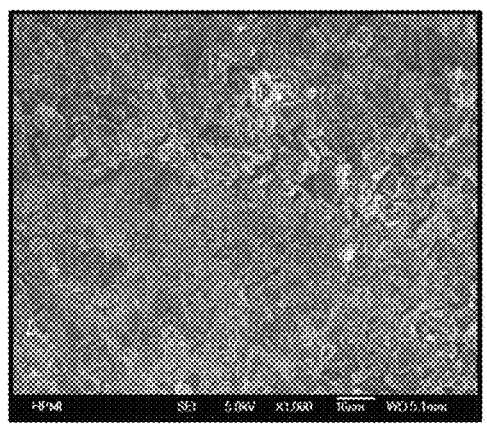
FIGS. 2A and 2B are SEM images of the cathode a Li-ion device.
Figure 2B:
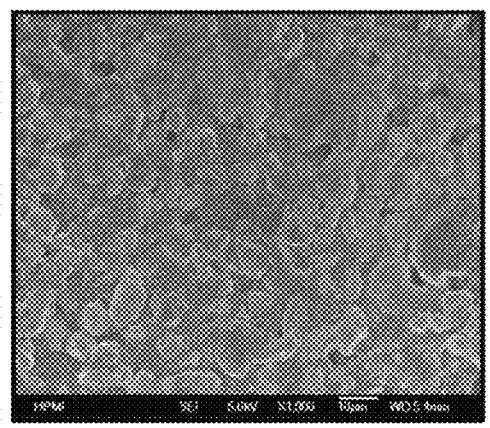

It can be observed in FIG. 2A that the AC sample shows an irregular shape with sharp edges with a particle sizes about 1-3 um. For the $LiCoO_2$ sample, it can be seen from FIG. 2b that the $LiCoO_2$ particles with a particle size about 1 um were covered by carbon black.

FIG. 3 shows the voltage profiles for cathodes based on $LiCoO_2$, AC, and $LiCoO_2$/AC in the voltage range of 4.1-2.0V under a constant current of 0.5 mA. The energy density of cell based on $LiCoO_2$ electrode (FIG. 3A), $LiCoO_2$/AC electrode (FIG. 3B) and AC electrode (FIG. 3C) are 344.1 Wh/kg, 149.2 Wh/kg, and 58.7 Wh/kg, respectively. It can be concluded that the energy density of the cell based on $LiCoO_2$ is about 5 times higher than that of cell based on AC, and the energy density of the $LiCoO_2$/AC electrode is lower than those of a cell with a$LiCoO_2$ electrode but is also about 2 times higher than that of a cell with a AC electrode.

FIG. 4 shows the voltage profiles for cells based on $LiCoO_2$ electrode (FIG. 4A), $LiCoO_2$/AC electrode (FIG. 4B) and AC electrode (FIG. 4C) for the first three cycles in the voltage range of 4.1-2.0V under a constant current of 5 mA. The difference between the data shown in FIG. 4 and that shown in FIG. 3 are the charge/discharge currents: 0.5 mA vs. 5 mA. FIG. 4 shows that the energy density of $LiCoO_2$ electrode, $LiCoO_2$/AC electrode and AC electrode are 6.0 Wh/kg, 31.1 Wh/kg, and 46.2 Wh/kg, respectively. This means that at a discharge current of 5 mA/s, the cell with the AC electrode has a higher energy density than the cell with the $LiCoO_2$ electrode or with the $LiCoO_2$/AC electrode.

The cell with the $LiCoO_2$/AC electrode performs at a higher energy density than that based on the AC electrode with a lower discharge power and has a higher energy density than the cell with the $LiCoO_2$ electrode with a higher discharge power density. This means that the cell with the $LiCoO_2$/AC electrode has a better balance of both power and energy, and provides a wider range of operation than either a LiB or a LiC.

TABLE 1

Equivalent Circuit Parameters for different cells

| Cell | L (H) | $R_S$ (Ω) | $R_P$ (Ω) | $C_P$ (Ω) | $R_{ct}$ (Ω) | $C_{dl}$ (F) | $R_{Ws}$ (Ω) | $T_{Ws}$ (ms) | $R_{Wo}$ (Ω) | $T_{Wo}$ (s) |
|---|---|---|---|---|---|---|---|---|---|---|
| $LiCoO_2$ | 1.49E−06 | 10.22 | 1.62 | 2.06E−06 | 3.40 | 2.61E−05 | 112.70 | 927.64 | | |
| AC | 1.33E−06 | 10.05 | 4.16 | 4.80E−05 | 2.52 | 5.95E−06 | 4.53 | 8.41 | 20.0 | 6.87 |
| AC/$LiCoO_2$ | 1.72E−06 | 10.73 | 2.55 | 5.51E−06 | 4.91 | 7.72E−05 | 15.87 | 164.56 | | |

Figure 5A:
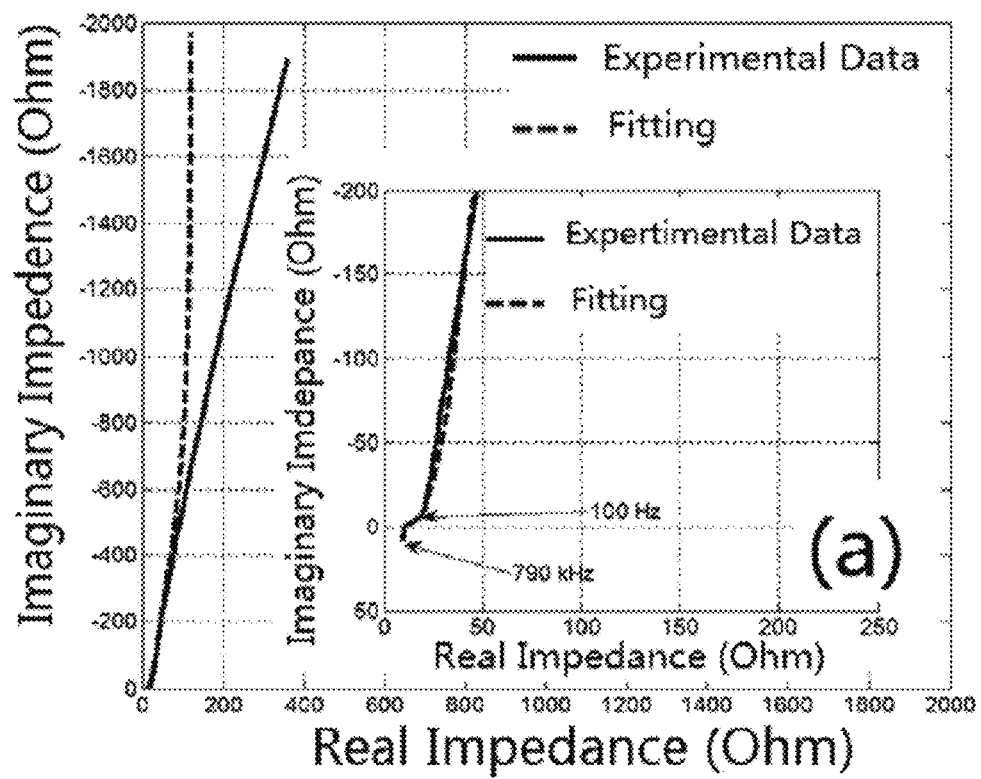
FIGS. 5A, 5B and 5C are Nyquist plots of experimental and fitting EIS data of $LiCoO_2$ electrode FIG. 5A, AC electrode FIG. 5B and $LiCoO_2$/AC cathode FIG. 5C.
Figure 5B:
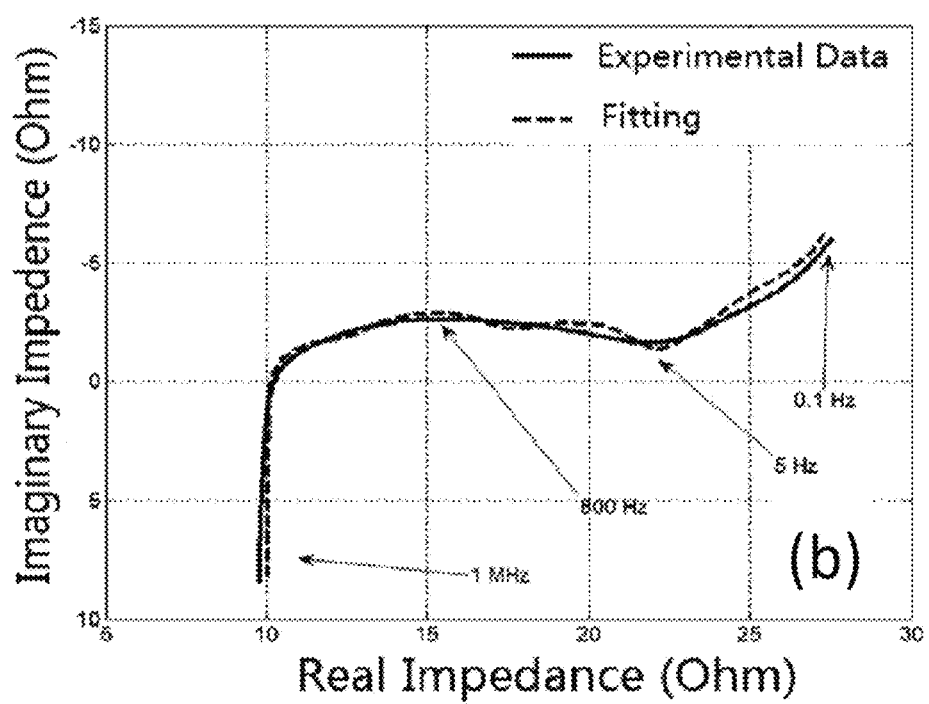
Figure 5C:
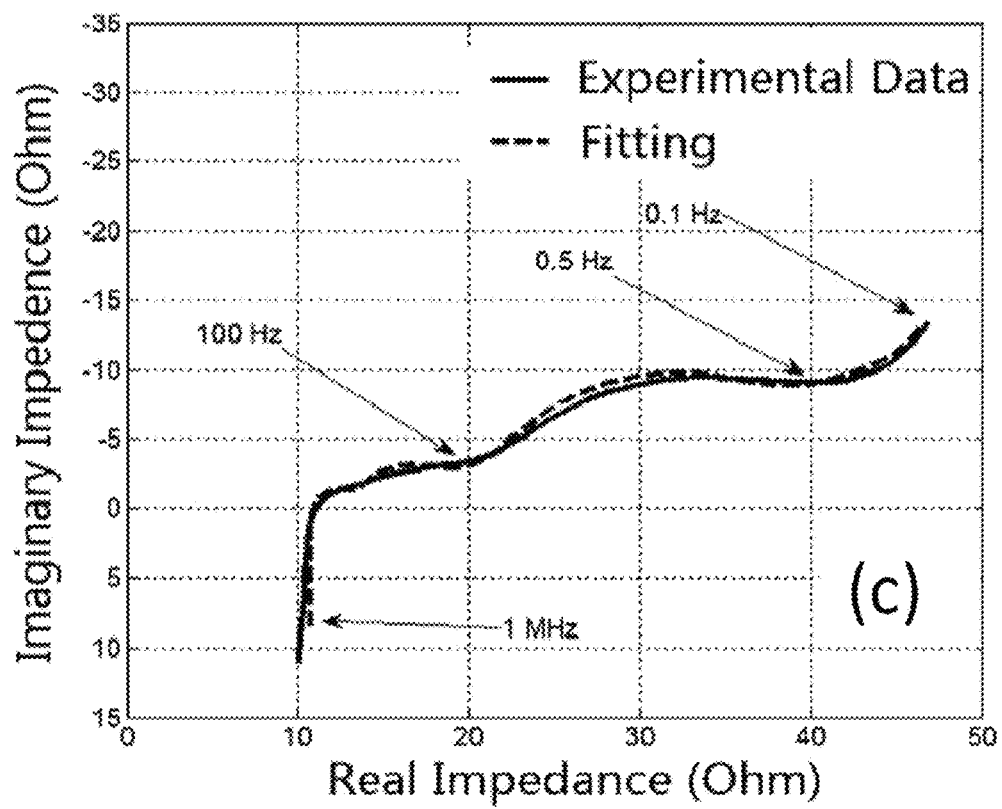

The electrochemical impedance spectra (EIS) of the three cells were obtained as shown in FIG. 5. These spectra were recorded in the range from 10 mHz to 1 MHz with a signal amplitude of 10 mV. All of the EIS were fitted by the electric equivalent circuit model as shown in FIG. 5, and Table 1 lists fitting parameters for each cell. P. L. Moss, G. Au, E. J. Plichta, and J. P. Zheng "Study of Capacity Fade of Lithium-Ion Polymer Rechargeable Batteries with Continuous Cycling", J. Electrochem. Soc. 157, A1 (2010).

The AC cathode material should behave like a Warburg open-circuit element ($R_{Wo}$ and $T_{Wo}$) while the hard carbon (HC) anode and $LiCoO_2$ cathode should behave like a short-circuit Warburg element. HC has a generally higher diffusion coefficient for Li-ions than $LiCoO_2$, leading to the conclusion that the short-circuit Warburg element seen in FIG. 5B for the LiB corresponds directly to the $LiCoO_2$ cathode material. This is why there is a high impedance for the $R_{Ws}$ parameter for the LiB.

Table 1 reveals that charge transfer kinetics ($R_{ct}/C_{dl}$) are similar in value. It is believed that this is due to the charge transfer of Li-ions in the HC intercalating into and out of the $Li_{1-x}C_6$ matrix. $R_P$ and $C_P$ are the passivation layer parameters defined by the SLMP materials left on the surface of the HC during initial cycling. This passivation layer is likely the leftover Li material that formed the shell of the SLMP and the initial solid-electrolyte-interface (SEI) formed during cycling on HC. The low diffusion time constant of the HC (10-900 ms) as compared to the AC material may be an effect of the SLMP. It is unusual for the HC to diffuse Li-ions faster (solid state-diffusion v. pore diffusion in AC), and this result has been seen in working with LiCs previously that employs SLMP for prelithiation.

Figure 6:
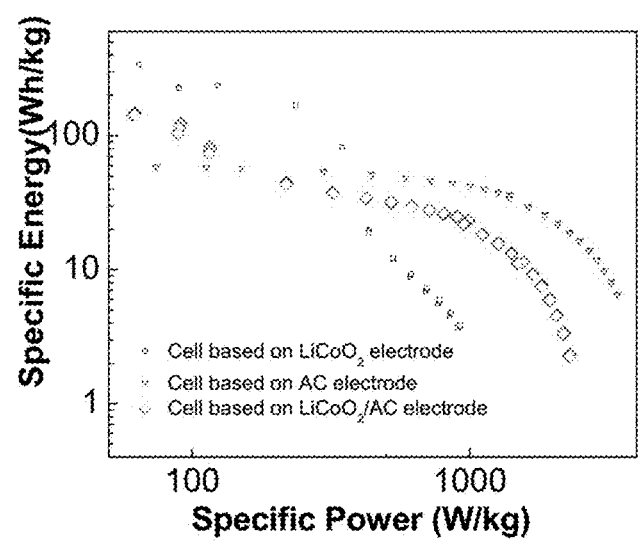
FIG. 6 is Ragone plots of cells based on different cathode materials.

The different devices were also discharged under constant power mode and FIG. 6 shows the Ragone plot based on the weight of activate materials. As shown in FIG. 6 the energy density decreases with increasing power energy for all cells, which demonstrates that, for an electrochemical storage system, it is very difficult to obtain a high energy density as well as a high power density.

At a power density less than 250 kW/kg, cells with a LiCoO$_2$ electrode perform at a higher energy density than others. At a power density higher than 250 kW/kg, cells with an AC electrode provide the highest energy density. This can result from the chemical properties of electrodes. The electric generation from a cell with a LiCoO$_2$ electrode is via the movement of lithium ions from the negative electrode to the positive electrode during discharge, and compared to the ion adsorption/desorption process of a cell with an AC electrode, this process is relative slow. In a situation that needs a quick output at a high power density, the reaction process does not have enough time to response to the output, and it performs a lower energy density.

Figure 7:
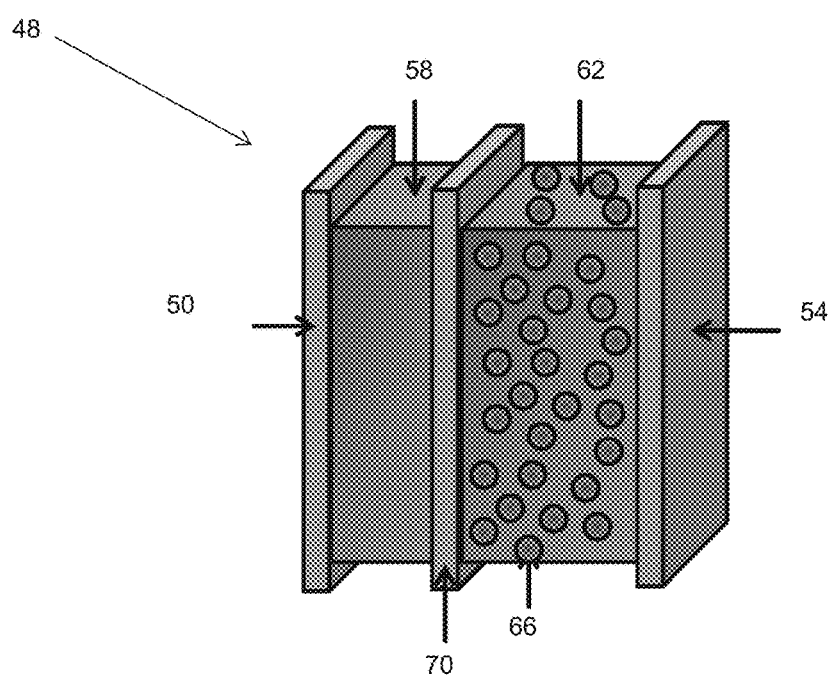
FIG. 7 is a schematic diagram of a unit cell energy storage device comprising an anode with a mixture of lithium metal particles and conductive carbon particles.
Figure 8:
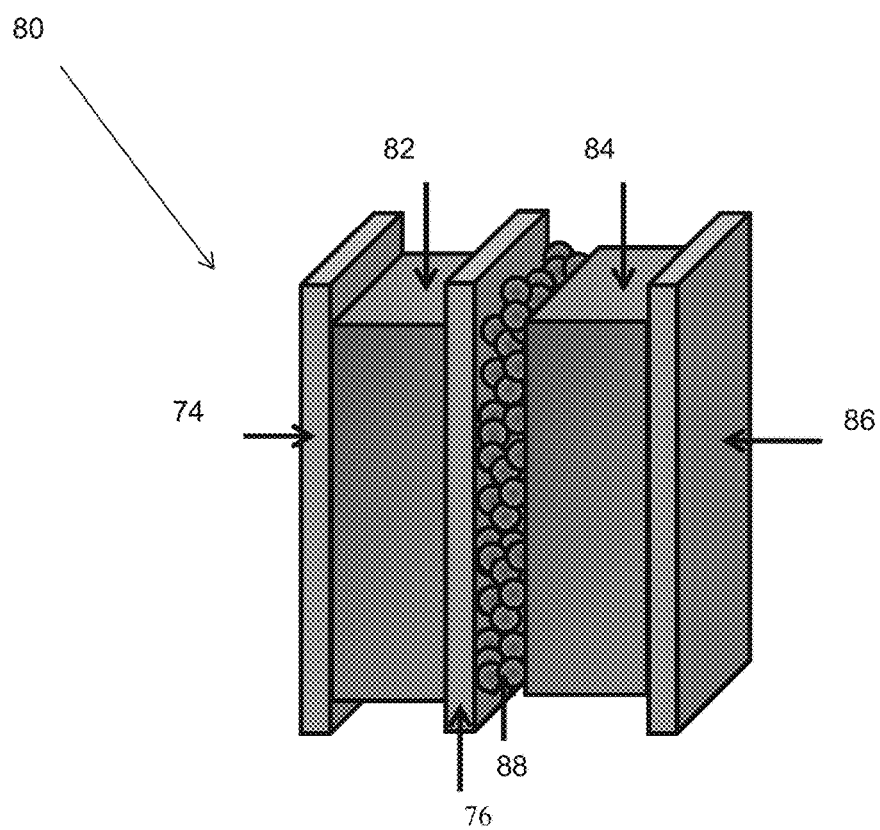
FIG. 8 is a schematic diagram of a unit cell energy storage device comprising an anode with two-layers of lithium metal particles and conductive carbon particles.
Figure 9:
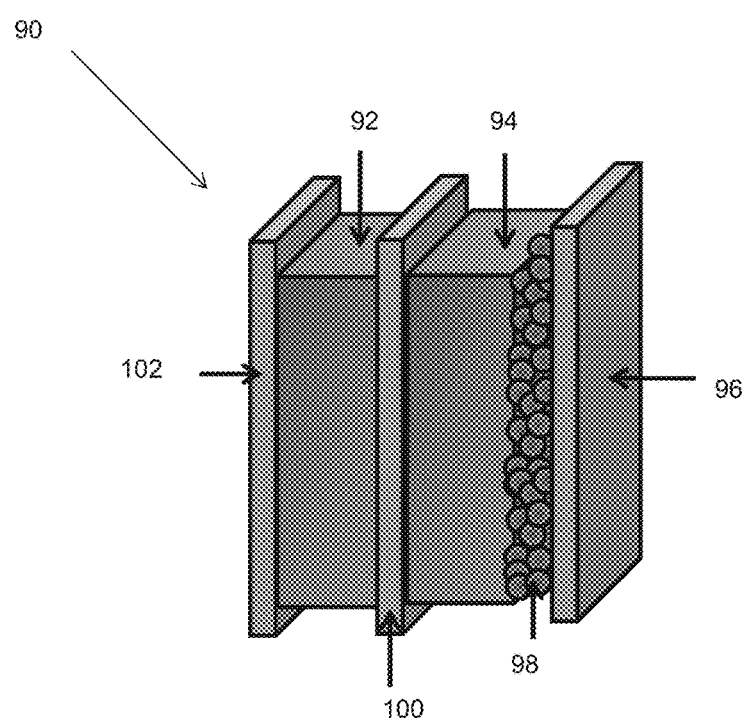
FIG. 9 is a schematic diagram of a unit cell energy storage device comprising an anode with two-layers of lithium metal particles and conductive carbon particles.
Figure 10:
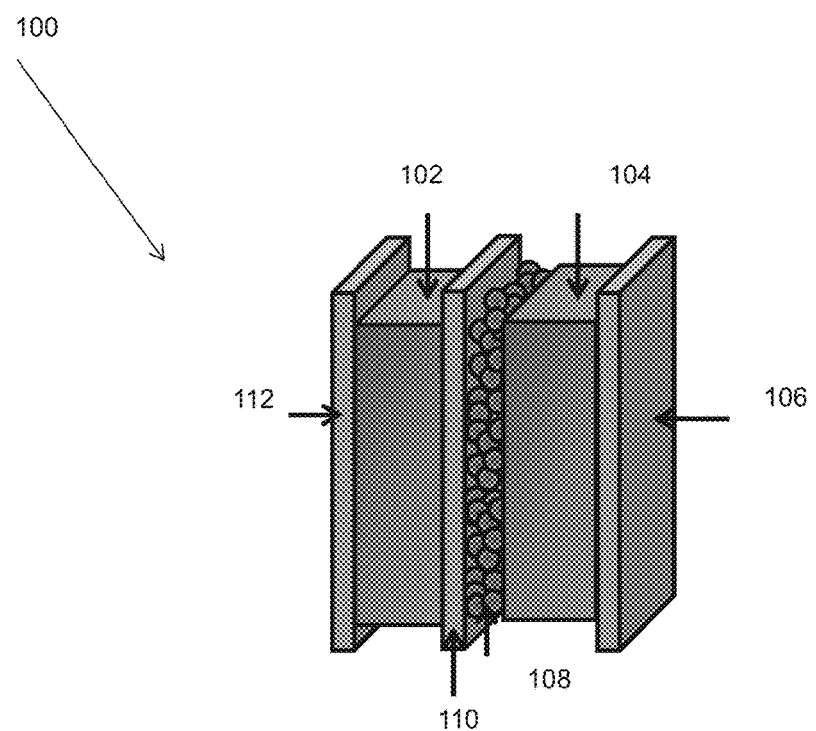
FIG. 10 is a schematic diagram of a unit cell energy storage device comprising a cathode with a mixture of lithium-intercalating metal oxide particles and conductive carbon particles.
Figure 11:
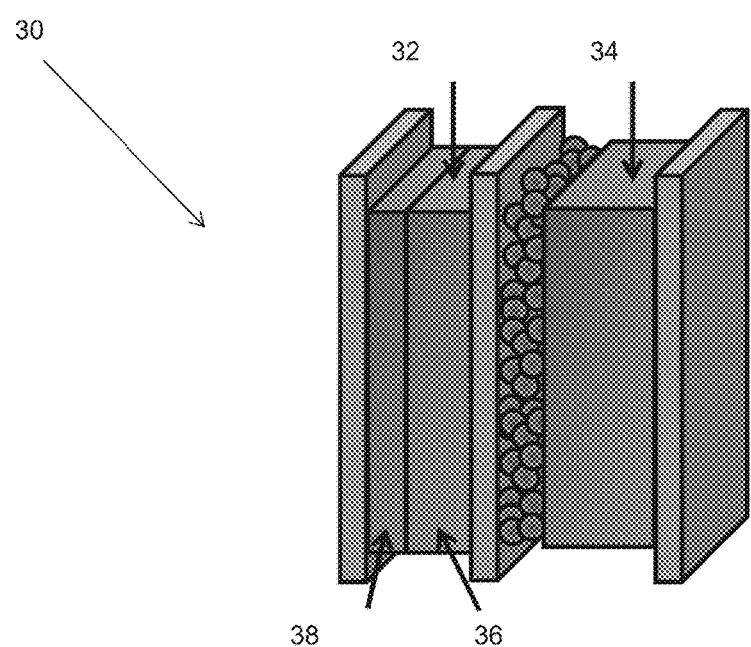
FIG. 11 is a schematic diagram of a unit cell energy storage device comprising a cathode with two-layers having a layer of lithium-intercalating metal oxide particles and a layer of conductive carbon particles.
Figure 12:
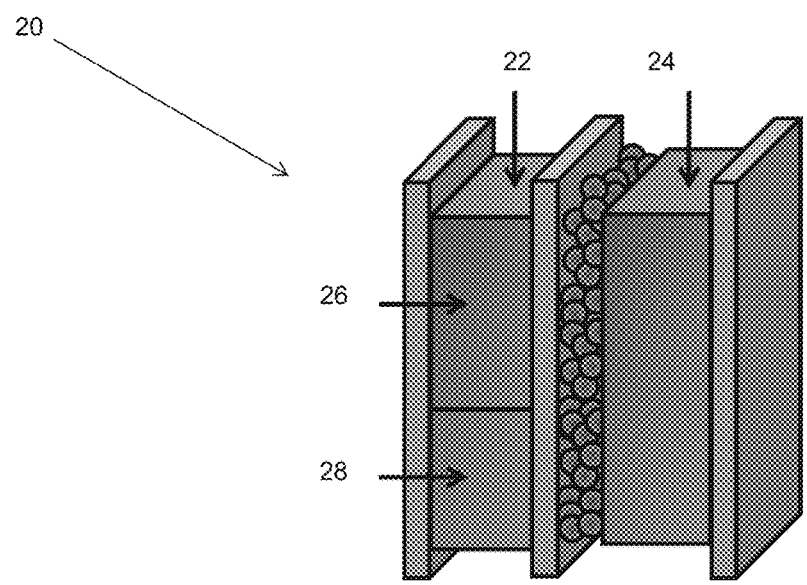
FIG. 12 is a schematic diagram of a unit cell energy storage device comprising a cathode with side-by-side layers of a layer of lithium-intercalating metal oxide particles and a layer of conductive carbon particles.
Figure 13:
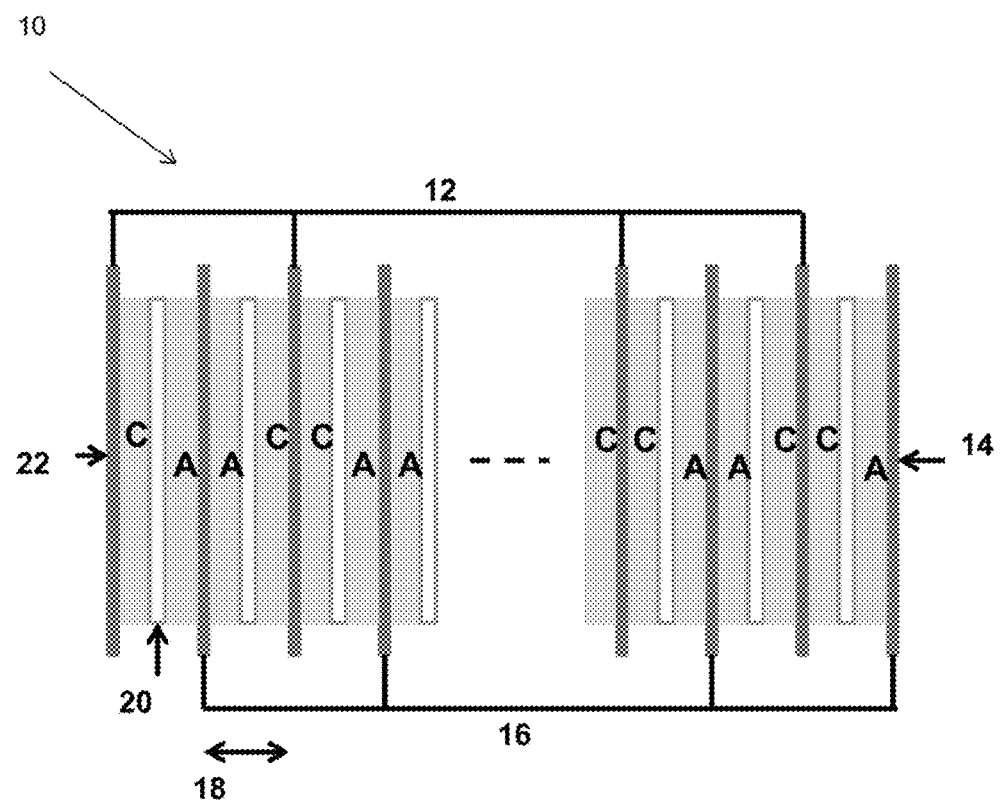
FIG. 13 is a schematic diagram of a pouch cell electrochemical energy storage device comprising multiple unit cells.

Many constructions of the invention are possible. FIG. 7 is a schematic diagram of a unit cell energy storage device comprising an anode with mixture of lithium metal particles and conductive carbon particles, the device 48 can include: cathode 58, anode 62, current collector 50, current collector 54, SLMP 66, and separator 70. FIG. 8 is a schematic diagram of a unit cell energy storage device comprising an anode with two-layer of lithium metal particles and conductive carbon particles, the device 80 can include: cathode 82, anode 84, current collector 86, SLMP 88, separator 76, and current collector 74. FIG. 9 is a schematic diagram of a unit cell energy storage device comprising an anode with two-layer of lithium metal particles and conductive carbon particles, the device 90 can include: cathode 92, anode 94, current collector 96, SLMP 98, separator 100, and current collector 102. FIG. 10 is a schematic diagram of a unit cell energy storage device comprising a cathode with a mixture of lithium-intercalating metal oxide particles and conductive carbon particles. The device 100 can include: battery/activated carbon mixed cathode 102, anode 104, current collector 106, SLMP 108, separator 110, and current collector 112. FIG. 11 is a schematic diagram of a unit cell energy storage device comprising a cathode with two-layer consisting of a layer of lithium-intercalating metal oxide particles and a layer of the conductive carbon particles. The device 30 can include: cathode 32, anode 34, activated carbon 36, battery cathode materials 38, separator 48, current collector 40, and current collector 44. FIG. 12 is a schematic diagram of a unit cell energy storage device comprising a cathode with side-by-side layer of a layer of lithium-intercalating metal oxide particles and a layer of the conductive carbon particles. The device 20 can include: cathode 22, anode 24, battery cathode materials 26, and activated carbon 28. FIG. 13 is a schematic diagram of a pouch cell electrochemical energy storage device comprising multiply unit cells. The device 10 can include: cathode 12, current collector 14, anode 16, unit cell 18, separator 20, and current collector 22.

In a cell according to the invention with a LiCoO$_2$/AC electrode, the positive electrode is a combination of an AC electrode and a LiCoO$_2$ electrode, and it has characteristics of both LiCoO$_2$ and AC electrodes. In a situation that needs a slow output, this device can perform with properties similar to a LiB, hence performing at a high energy density. In a situation requiring a quick output, this device can perform with properties similar to a LiC, leading to a high power density. A cell according to the invention performs at a higher energy density than cell with an AC electrode at a low power density, and performs a higher energy density than that of cell with a LiCoO$_2$ electrode at a high power density. This demonstrates the advantages of a cell according to the invention: the high energy density of a LiB and the advantage of a high power density of LiC, which can satisfy both the demand of high energy density and a high power density of energy storage system.

All references cited in this patent application are hereby incorporated fully by reference. This invention can be embodied in other forms without departing from the spirit or essential attributes thereof, and according reference should be made to the following claims to determine the scope of the invention.

We claim:
1. A method of producing an electrochemical energy storage device, comprising:
    an anode produced from disposing a first mixture on a first current collector, the first mixture comprising a plurality of lithium metal materials and a first plurality of lithium-intercalating electrically conductive carbon-comprising particles, the weight ratio of carbon-comprising and lithium metal materials being from 30:1 to 3:1;
    a cathode produced from disposing a second mixture on a second current collector, the second mixture comprising a second plurality of electrically conductive carbon-comprising particles and lithium-intercalating metal oxide particles, the weight ratio of carbon-comprising and lithium-intercalating metal oxide particles being from 1:20 to 5:1;
    wherein the weight ratio between the lithium metal materials in the anode and the second plurality of electrically conductive carbon comprising particles in the cathode is from 0.1-10%; and,
    providing a housing and positioning within the housing the first current collector, second current collector, with an electrically insulating porous separating layer there between; and,
    introducing an electrolyte into said housing;
    wherein the first mixture in an initial state further comprises two layers, comprising a layer of lithium metal materials and a layer of the first plurality of carbon-comprising particles.
2. The method of claim 1, wherein the weight ratio between the lithium metal materials in the anode and the second plurality of carbon-comprising particles in the cathode is from 0.3-5%.
3. The method of claim 1, wherein the weight ratio between the lithium metal materials in the anode and the second plurality of carbon-comprising particles in the cathode is from 0.6-1.7%.
4. The method of claim 1, wherein the second plurality of carbon-comprising particles in the cathode has an electrical conductivity greater than 1 S/cm.
5. The method of claim 1, wherein the second plurality of carbon-comprising particles in the cathode has a specific surface area greater than 500 m$^2$/g.
6. The method of claim 1, wherein the second plurality of carbon-comprising particles in the cathode has a specific capacitance greater than 50 F/g.
7. The method of claim 1, wherein the second plurality of carbon-comprising particles in the cathode has a porosity greater than 50%.
8. The method of claim 1, wherein the weight ratio of the first plurality of carbon-comprising particles and lithium metal materials in the anode is from 20:1 to 8:1.
9. The method of claim 1, wherein the weight ratio of the first plurality of carbon-comprising particles and lithium metal materials in the anode is from 17:1 to 11:1.

10. The method of claim 1, wherein the weight ratio of the second plurality of carbon-comprising particles and lithium-intercalating metal oxide particles in the cathode is from 1:5 to 3:1.

11. The method of claim 1, wherein the weight ratio of the second plurality of carbon-comprising particles and lithium-intercalating metal oxide particles in the cathode is from 1:2 to 2:1.

12. The method of claim 1, wherein the first plurality of carbon-comprising particles in the anode comprises at least one selected from the group consisting of hard carbon, soft carbon, graphitic carbon, carbon black, carbon microbeads, carbon nanotubes, and carbon nanofibers.

13. The method of claim 1, wherein the second plurality of carbon-comprising particles in the cathode comprises at least one selected from the group consisting of activated carbon, carbon microbeads, carbon black, carbon nanotubes, activated carbon nanotubes, and activated carbon nanofibers.

14. The method of claim 1, wherein the lithium metal oxide particles comprise at least one selected from the group consisting of $LiCoO_2$ (lithium cobalt oxide), $LiNi_{0.8}Co_{0.15}Al_{0.05}O_2$ (NCA), $LiMn_2O_4$ (spinel), $LiV_3O_8$, $LiNi_{1/3}Mn_{1/3}Co_{1/3}O_2$ (NMC 333), $LiMn_xCo_yNi_zO_2$ (NMC non-stoichiometric), where x+y+z=1, $LiFePO_4$ (lithium iron phosphate), $xLi_2MnO_3 \cdot (1-x)LiMO_2$, $LiNi_{1/3}Mn_{1/3}Co_{1/3}O_2$, $LiNi_{1/3}Mn_{1/3}Co_{1/3}O_2$, $Li[Li_{0.2}Mn_{0.54}Ni_{0.13}Co_{0.13}]O_2$, and $Li[Li_{0.2}Mn_{0.54}Ni_{0.13}C_{o0.13}]O_2$.

15. The method of claim 1, wherein the first mixture in an initial state further comprises a plurality of lithium metal materials mixed with said first plurality of carbon-comprising particles, and wherein the first plurality of carbon-comprising particles in the initial state are substantially free of lithium ions.

16. The method of claim 1, wherein the layer of lithium metal materials at the initial state is positioned between the layer of the first plurality of carbon-comprising particles and the separating layer.

17. The method of claim 1, wherein the layer of lithium metal materials at the initial state is positioned between the first plurality of electrically conductive carbon and the current collector.

18. The method of claim 1, wherein the second mixture in an initial state further comprises lithium-intercalating metal oxide particles mixed with the second plurality of carbon-comprising particles.

19. A method of producing an electrochemical energy storage device, comprising:
   an anode produced from disposing a first mixture on a first current collector, the first mixture comprising a plurality of lithium metal materials and a first plurality of lithium-intercalating electrically conductive carbon-comprising particles, the weight ratio of carbon-comprising and lithium metal materials being from 30:1 to 3:1;
   a cathode produced from disposing a second mixture on a second current collector, the second mixture comprising a second plurality of electrically conductive carbon-comprising particles and lithium-intercalating metal oxide particles, the weight ratio of carbon-comprising and lithium-intercalating metal oxide particles being from 1:20 to 5:1;
   wherein the weight ratio between the lithium metal materials in the anode and the second plurality of electrically conductive carbon comprising particles in the cathode is from 0.1-10%;
   providing a housing and positioning within the housing the first current collector, second current collector, with an electrically insulating porous separating layer there between; and,
   introducing an electrolyte into said housing;
   wherein the second mixture in an initial state further comprises two layers comprising a layer of the lithium-intercalating metal oxide particles and a layer of the second plurality of carbon-comprising particles.

20. A method of producing an electrochemical energy storage device, comprising:
   an anode produced from disposing a first mixture on a first current collector, the first mixture comprising a plurality of lithium metal materials and a first plurality of lithium-intercalating electrically conductive carbon-comprising particles, the weight ratio of carbon-comprising and lithium metal materials being from 30:1 to 3:1;
   a cathode produced from disposing a second mixture on a second current collector, the second mixture comprising a second plurality of electrically conductive carbon-comprising particles and lithium-intercalating metal oxide particles, the weight ratio of carbon-comprising and lithium-intercalating metal oxide particles being from 1:20 to 5:1;
   wherein the weight ratio between the lithium metal materials in the anode and the second plurality of electrically conductive carbon comprising particles in the cathode is from 0.1-10%;
   providing a housing and positioning within the housing the first current collector, second current collector, with an electrically insulating porous separating layer there between; and,
   introducing an electrolyte into said housing;
   wherein the second mixture in an initial state further comprises multiple layers comprising alternating layers of the lithium-intercalating metal oxide particles and the second plurality of carbon-comprising particles.

21. A method of producing an electrochemical energy storage device, comprising:
   an anode produced from disposing a first mixture on a first current collector, the first mixture comprising a plurality of lithium metal materials and a first plurality of lithium-intercalating electrically conductive carbon-comprising particles, the weight ratio of carbon-comprising and lithium metal materials being from 30:1 to 3:1;
   a cathode produced from disposing a second mixture on a second current collector, the second mixture comprising a second plurality of electrically conductive carbon-comprising particles and lithium-intercalating metal oxide particles, the weight ratio of carbon-comprising and lithium-intercalating metal oxide particles being from 1:20 to 5:1;
   wherein the weight ratio between the lithium metal materials in the anode and the second plurality of electrically conductive carbon comprising particles in the cathode is from 0.1-10%;
   providing a housing and positioning within the housing the first current collector, second current collector, with an electrically insulating porous separating layer there between; and,
   introducing an electrolyte into said housing;
   wherein the second mixture in an initial state further comprises side-by-side layers of the lithium-intercalating metal oxide particles and the second plurality of carbon-comprising particles.

\* \* \* \* \*